United States Patent
Marlett et al.

(10) Patent No.: US 9,950,577 B1
(45) Date of Patent: Apr. 24, 2018

(54) METHOD TO LOCALIZE PHYSICAL POSITIONS OF BLUETOOTH TIRE PRESSURE MONITORING SENSORS

(71) Applicant: Continental Automotive Systems, Inc., Auburn Hills, MI (US)

(72) Inventors: Brian J. Marlett, Macomb, MI (US); Michael Eric Pierfelice, Birmingham, MI (US); Troy Allen Bartz, Lak Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/667,852

(22) Filed: Aug. 3, 2017

(51) Int. Cl.
| | |
|---|---|
| *B60C 23/04* | (2006.01) |
| *H04W 4/00* | (2018.01) |
| *H04B 5/00* | (2006.01) |
| *H04W 84/18* | (2009.01) |
| *H04L 29/06* | (2006.01) |
| *G07C 9/00* | (2006.01) |
| *H04W 76/02* | (2009.01) |
| *H04L 29/08* | (2006.01) |

(52) U.S. Cl.
CPC ....... *B60C 23/0433* (2013.01); *H04B 5/0031* (2013.01); *H04L 63/0876* (2013.01); *H04W 4/008* (2013.01); *H04W 84/18* (2013.01); *G07C 2009/00317* (2013.01); *G07C 2209/63* (2013.01); *H04L 67/12* (2013.01); *H04W 76/023* (2013.01)

(58) Field of Classification Search
CPC .............. B60C 23/0433; H04B 5/0031; H04L 63/0876; H04W 4/008; H04W 84/18
USPC ......................................................... 340/442
See application file for complete search history.

(56) References Cited

U.S. PATENT DOCUMENTS

| | | | |
|---|---|---|---|
| 7,382,239 B2* | 6/2008 | Song ................... | B60C 23/0408 340/442 |
| 7,574,293 B2* | 8/2009 | Vredevoogd ....... | B60C 23/0416 340/442 |
| 7,716,976 B2* | 5/2010 | Lin ..................... | B60C 23/0416 73/146.4 |
| 8,009,027 B2* | 8/2011 | Thomas ................ | B60C 23/068 340/3.1 |
| 8,344,869 B2* | 1/2013 | Lickfelt .............. | B60C 23/0418 340/438 |
| 9,789,738 B2* | 10/2017 | Rokhsaz ................. | B60C 23/00 |
| 9,796,219 B2* | 10/2017 | Chong ................ | B60C 23/0479 |

\* cited by examiner

*Primary Examiner* — Omar Casillashernandez

(57) ABSTRACT

The location of a replacement tire pressure sensor for a tire pressure monitoring system is determined by comparing received signal strength indicator (RSSI) values for the replacement sensor as received by several different receivers to an array of stored RSSI values provided by each sensor at each wheel by the same receivers when the vehicle is manufactured.

6 Claims, 3 Drawing Sheets

LEFT FRONT

| TIRE ANGLE | BLE- AM1 | BLE- AM2 | ... | BLE- AMX |
|---|---|---|---|---|
| 5 | | | | |
| 10 | | | | |
| 15 | | | | |
| ... | | | | |
| 360 | | | | |

RIGHT FRONT

| TIRE ANGLE | BLE- AM1 | BLE- AM2 | ... | BLE- AMX |
|---|---|---|---|---|
| 5 | | | | |
| 10 | | | | |
| 15 | | | | |
| ... | | | | |
| 360 | | | | |

RIGHT REAR

| TIRE ANGLE | BLE- AM1 | BLE- AM2 | ... | BLE- AMX |
|---|---|---|---|---|
| 5 | | | | |
| 10 | | | | |
| 15 | | | | |
| ... | | | | |
| 360 | | | | |

LEFT REAR

| TIRE ANGLE | BLE- AM1 | BLE- AM2 | ... | BLE- AMX |
|---|---|---|---|---|
| 5 | RSSI | RSSI | RSSI | RSSI |
| 10 | RSSI | RSSI | RSSI | RSSI |
| 15 | RSSI | RSSI | RSSI | RSSI |
| ... | RSSI | RSSI | RSSI | RSSI |
| 360 | RSSI | RSSI | RSSI | RSSI |

FIG. 2

METHOD TO LOCALIZE PHYSICAL POSITIONS OF BLUETOOTH TIRE PRESSURE MONITORING SENSORS

BACKGROUND

Bluetooth Low Energy or "BLE" is a wireless, personal-area network technology designed and marketed by the Bluetooth special interest group. It is used in many industries. Bluetooth Low Energy uses considerably less power and is less costly than classic Bluetooth but has a similar communication range.

Bluetooth Low Energy technology is becoming more prevalent in vehicle systems. It is also now being used with tire pressure monitoring systems (TPMS).

In a TPMS, Bluetooth Low Energy transceivers inside a tire transmit Bluetooth Low Energy signals that carry tire pressure information. Those BLE signals are received by a controller on the vehicle. When a controller on a vehicle receives multiple different TPMS sensor signals from multiple different TPMS sensors in different tires, the controller needs to be able to "know" or identify a particular TPMS sensor from which a BLE signal came from so that the controller and the Bluetooth low energy TPMS systems can provide real-time information about actual tire pressure with respect to their physical location on the vehicle.

Tire pressure monitoring sensors in a tire sometimes need to be replaced. Since tire pressure monitoring sensors communicate wirelessly with a controller, the controller needs to know where each sensor is located on the vehicle. Stated another way, when a tire pressure monitoring sensor is replaced, a method of automatically determining where each sensor is located on the vehicle would be an improvement over the prior art.

BRIEF DESCRIPTION OF THE FIGURES

FIG. 2 depicts tables of received signal strength indicators (RSSI) received by a controller depicted in FIG. 1;

DETAILED DESCRIPTION

Figure 1:
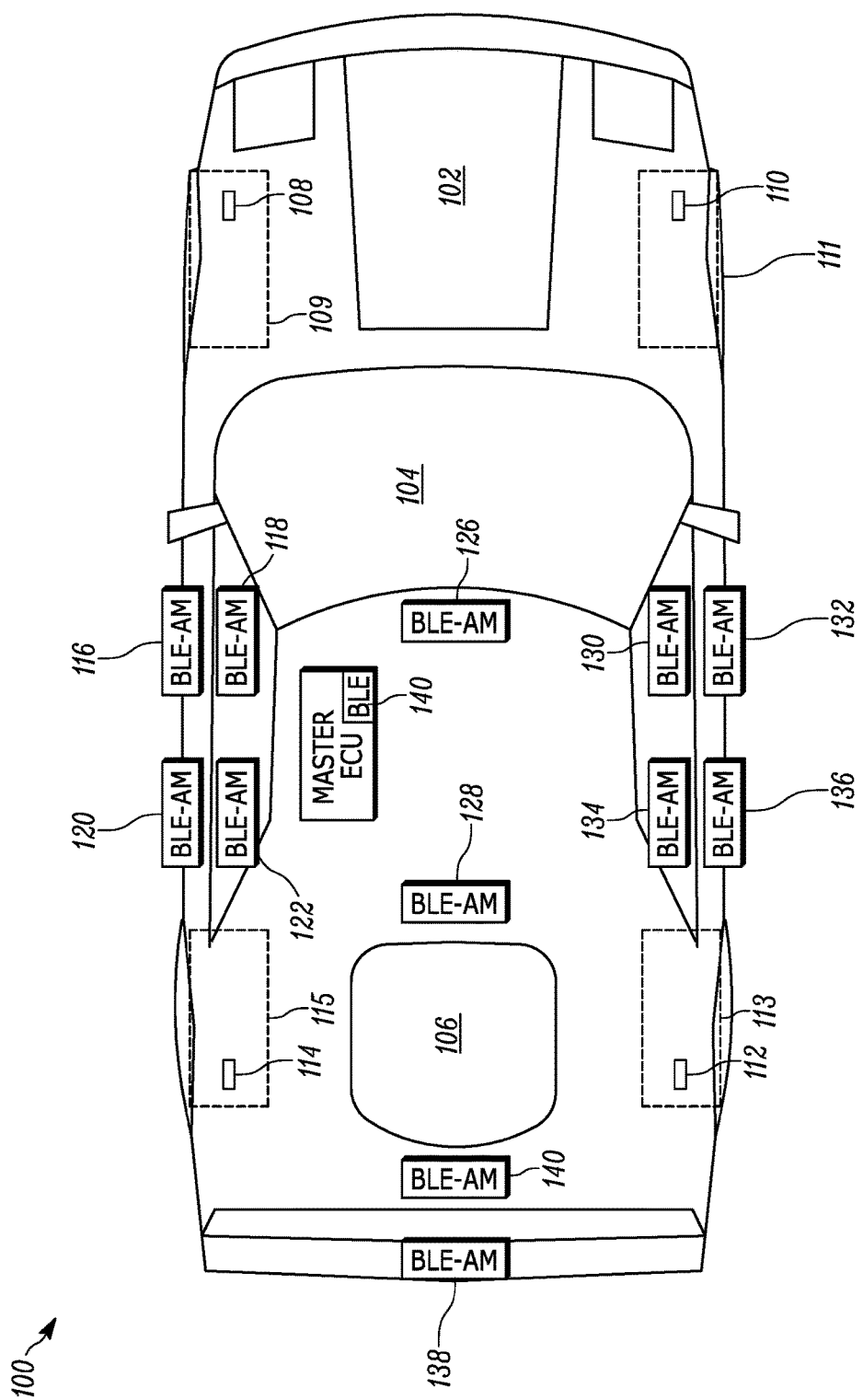
FIG. 1 is a depiction of a motor vehicle and the locations of Bluetooth low energy antenna modules attached to the vehicle at different locations.

FIG. 1 is a top or plan view of a motor vehicle 100. The vehicle 100 has a front hood 102, a windshield 104 and a rear windshield 106. A Bluetooth low energy tire pressure monitoring sensor or "BLE-TPMS" 108, 110, 112 and 114 is located inside each vehicle tire 109, 111, 113 and 115.

In the preferred embodiment, thirteen (13) Bluetooth Low Energy antenna modules (BLEAMs) 116, 118, 120, 122, 126, 128, 130, 132, 134, 136, 138 and 140 are located at pre-determined locations on the vehicle. (That there were 13 BLEAMS was a design choice due to vehicle characteristics. Other numbers of BLEAMS can be used too.)

As shown in FIG. 1, four Bluetooth low energy antenna modules 116, 118, 120 and 122 are located on the left or driver's side portion of the vehicle 100 between the two left-side tires 109, 115. Similarly, four Bluetooth low energy antenna modules 130, 132, 134 and 136 are located on the right or passenger side of the vehicle between the two tires 111, 113 on the right side. A Bluetooth low energy antenna module 126 is located at the front of a passenger compartment and another Bluetooth low energy antenna module 128 is located at the rear portion of the passenger compartment. Two other Bluetooth low energy antenna modules 138 and 140 are located at the rear of the vehicle behind the rear windshield 106.

As is well known, the strength of a signal transmitted from one of the Bluetooth low energy tire pressure monitoring sensors 108, 110, 112, 114 at a BLEAM will vary with its distance to that BLEAM. In a preferred embodiment of the invention, the received signal strength indicators (RSSI) from each Bluetooth low energy antenna module (BLEAM) is obtained during the vehicle's manufacturing process for a typical or standard tire pressure monitoring sensor located in each tire. That, time-of-manufacture RSSI data shows how signals from the tire pressure monitoring sensors in the different tires are blocked or attenuated due to vehicle characteristics. Each vehicle style therefore preferably has its own record of the received signal strength indicator from each tire pressure monitoring sensor for multiple different angles of rotation of each wheel. The time-of-manufacture RSSI data thus provides a model of how the RSSIs should be when a TPMS sensor is replaced.

FIG. 2 depicts four tables 202, 204, 206 and 208 of received signal strength indicator values. The indicator values are obtained or received from each of the Bluetooth Low Energy Antenna Modules for tire rotation angles that vary between 5 degrees and 360 degrees of rotation at the time of the vehicle's manufacture or assembly. A group or collection of reference tire pressure monitoring sensor signals is thus obtained for each vehicle wheel/tire assembly by transmitting a signal from each tire pressure, and monitoring the RSSI provided by each of the thirteen Bluetooth low energy transceivers 116-140 in response to the signals transmitted from each tire.

As can be seen in FIG. 2, each received signal strength indicator value obtained at each five-degree increment of wheel rotation is recorded in a table. The tables are stored in or accessible to a processor (See element 402 in FIG. 4.) on the vehicle. Stated another way, tables of recorded RSSI values for the tire pressure monitoring sensor in each wheel is recorded for a particular vehicle, when the vehicle is assembled.

Figure 3:
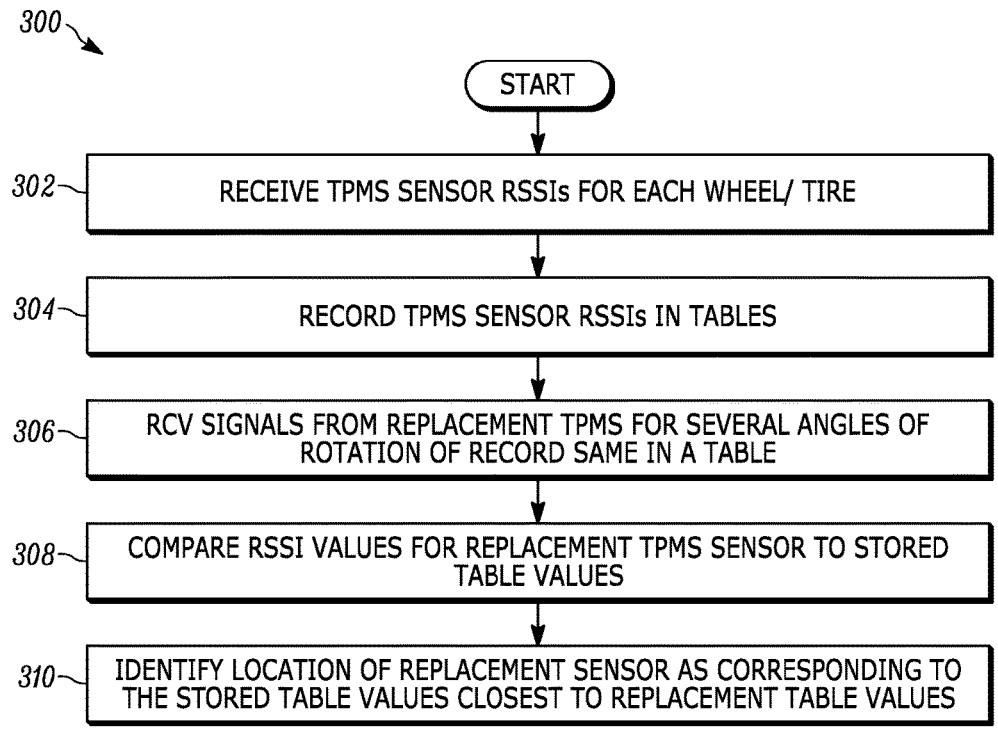
FIG. 3 is a flow chart depicting steps of a method of determining a particular wheel where a replacement Bluetooth tire pressure monitoring sensor is located on a particular type of vehicle.

FIG. 3 depicts steps of a method 300 for determining where a replacement Bluetooth Low Energy (BLE) Tire Pressure Monitoring System (TPMS) sensor is located on a particular wheel of a particular vehicle. A replacement Bluetooth TPMS sensor must of course be capable of transmitting a Bluetooth-compliant signal. As is known, such a signal will be received by all of the Bluetooth transceivers within the signal's propagation range.

At a first step 302, TPMS sensor signals are received at the different Blue Tooth Low Energy Antenna Modules (BLEAMs) from each wheel/tire. At the next step 304, the signal strength of each signal transmitted by each TPMS sensor in each wheel/tire at each of several different wheel rotation angles is recorded and stored in a table for each wheel.

For example, the left front wheel TPMS sensor will have associated with it, a table of received signal strength indicators for each of the Bluetooth Low Energy Antenna Modules (BLEAMs). Each BLEAM will thus generate a corresponding table of received signal strength indicator values for each tire pressure monitoring sensor in each wheel.

At step, 306, which is performed after a TPMS sensor is replaced, a signal from the replacement TPMS is received by each BLEAM and preferably for multiple different rotation angles of the wheel where the replacement TPMS was installed. As should be known, each BLEAM will have its own received signal strength indicator (RSSI) for each of the second signals transmitted from the replacement TPMS with a corresponding RSSI value.

At step 308, the different RSSI values from each Bluetooth transceiver for the second signal that is transmitted by the replacement TPMS is compared to the table values. The location of the replacement TPMS is thus determined by comparing the recorded RSSI values for the replacement TPMS to the table values recorded at the time of manufacture that most closely resemble the RSSI table values for the replacement TPMS.

In a preferred embodiment, the method of claim 1 is performed with 13 Bluetooth low energy transceivers.

Figure 4:
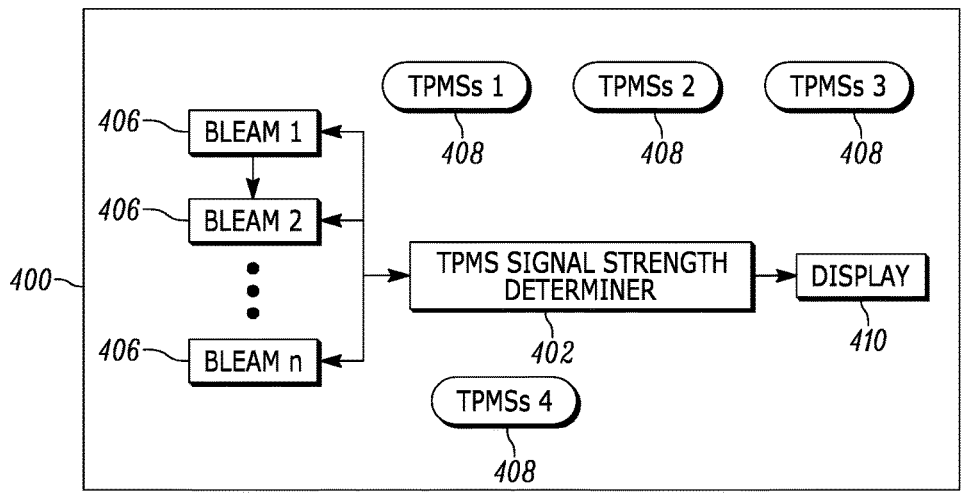
FIG. 4 is a depiction of an apparatus that can perform the method steps shown in FIG. 3.

Finally, FIG. 4 depicts a motor vehicle 400 configured to determine where a replacement Bluetooth tire pressure monitoring system (TPMS) sensor is located. The apparatus includes a reference TPMS signal strength information determiner 402, preferably embodied as a processor that executes program instructions. Those instructions are selected to cause the processor to receive information-bearing signals from several BLE Antenna Modules (BLEAMs) 406 located through-out the vehicle. The information-bearing signals from the BLEAMs represent signals that are received by each BLEAM from each of the tire pressure monitoring sensors 408 inside each tire. The RSSIs from each BLEAM for each TPMS sensor 408 in each tire are recorded for several different wheel rotation angles and stored in tables by the determiner 402.

Those of ordinary skill in the art should recognize the advantages of being able to replace a tire pressure monitoring sensor and have the vehicle automatically determine the particular wheel where the replacement TPMS is located. The foregoing description is for purposes of illustration only. The true scope of the invention is set forth in the following claims.

What is claimed is:

1. A method of determining a particular wheel where a replacement Bluetooth tire pressure monitoring system (TPMS) sensor is located on a particular type of vehicle, the replacement Bluetooth TPMS sensor being capable of transmitting a Bluetooth-compliant radio frequency signal to a plurality of Bluetooth Low Energy Antenna Modules (BLEAMs) mounted at predetermined locations on the particular type of vehicle the method comprising:
   obtaining reference TPMS sensor signal strength information for each vehicle wheel TPMS sensor by:
   receiving at each BLEAM, a first signal from each TPMS sensor in each tire; determining a received signal strength indicator (RSSI) value for each BLEAM for each TPMS sensor in each tire;
   for each RSSI value obtained for the first signal transmitted from each TPMS attached to each wheel, recording the RSSI values for each wheel's TPMS into a table of RSSI values for each wheel's TPMS;
   storing the tables of recorded RSSI values for the wheels in a processor on the vehicle; when a TPMS on the vehicle wheel is replaced;
   receiving a second signal from the replacement TPMS at each BLEAM;
   obtaining a received signal strength indicator (RSSI) from each BLEAM mounted on the vehicle for the second signal;
   comparing the RSSI values from each BLEAM to RSSI values recorded in each table for the first signal; and
   identifying the particular wheel where the replacement TPMS is located as corresponding to the recorded RSSI values that are closest to the recorded RSSI values for the first signal.

2. The method of claim 1, wherein the method uses thirteen BLEAMs.

3. The method of claim 1, wherein the vehicle has two wheels on each side of the vehicle and wherein two BLEAMs of the plurality of BLEAMs are located between the wheels on each side of the vehicle.

4. The method of claim 3, wherein the vehicle has a rear windshield and wherein two BLEAMs of the plurality of BLEAMs are located behind the rear windshield.

5. The method claim 4, wherein the vehicle has a passenger compartment and wherein a first BLEAM of the plurality of BLEAMs is located at a front portion of the passenger compartment and wherein a second BLEAM of the plurality of BLEAMs is located at a rear portion of the passenger compartment.

6. A motor vehicle configured to determine a particular wheel where a replacement Bluetooth tire pressure monitoring sensor (TPMS) is located, the replacement Bluetooth TPMS being capable of transmitting a Bluetooth-compliant radio frequency signal to a plurality of Bluetooth transceivers mounted at predetermined locations on the particular type of vehicle, the vehicle comprising:
   a reference TPMS signal strength information determiner configured to:
   receive information from the TPMS sensor attached to each wheel of the vehicle at each of the plurality of Bluetooth transceivers on the vehicle;
   obtain a received signal strength indicator (RSSI) values from each of the plurality of Bluetooth transceivers mounted on the vehicle, for a first signal transmitted from the TPMS attached to each wheel of the vehicle and for each RSSI value obtained for the first signal transmitted from each TPMS attached to each wheel, record the RSSI values for each wheel's TPMS into a table of RSSI values for each wheel's TPMS;
   and store the tables of recorded RSSI values for the wheels in a processor on the vehicle; when a TPMS on the vehicle wheel is replaced;
   the reference TPMS signal strength information determiner being configured to receive a second signal from the replacement TPMS;
   obtain a received signal strength indicator (RSSI) from each of the plurality of Bluetooth transceivers mounted on the vehicle for the second signal;
   compare the RSSI from each Bluetooth transceiver for the second signal transmitted by the replacement TPMS, to the values recorded in each table for the first signal; and
   identify the particular wheel where the replacement TPMS is located as corresponding to the recorded RSSI values that are closest to the recorded RSSI values for the first signal.

\* \* \* \* \*